(12) United States Patent
Minter (10) Patent No.: US 11,330,735 B2
(45) Date of Patent: May 10, 2022

(54) POINT OF SALE TERMINAL COOLING DUCT

(71) Applicant: NCR Corporation, Atlanta, GA (US)

(72) Inventor: Joshua Bryan Minter, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 25 days.

(21) Appl. No.: 16/723,471

(22) Filed: Dec. 20, 2019

(65) Prior Publication Data

US 2021/0195788 A1 Jun. 24, 2021

(51) Int. Cl.
| | |
|---|---|
| H05K 5/02 | (2006.01) |
| H05K 7/20 | (2006.01) |
| G06K 7/14 | (2006.01) |
| G06K 7/10 | (2006.01) |
| G06Q 20/20 | (2012.01) |

(52) U.S. Cl.
CPC ..... *H05K 7/20145* (2013.01); *G06K 7/10722* (2013.01); *G06K 7/1413* (2013.01); *G06Q 20/208* (2013.01); *H05K 5/0217* (2013.01)

(58) Field of Classification Search
CPC ............. H05K 7/20145; H05K 5/0217; G06K 7/10722; G06K 7/1413; G06Q 20/208
See application file for complete search history.

(56) References Cited

U.S. PATENT DOCUMENTS

| | | | |
|---|---|---|---|
| 9,703,320 B2* | 7/2017 | Bowers | ............... G06F 1/20 |
| 2016/0359307 A1* | 12/2016 | Vezina | ................. H02B 1/04 |
| 2019/0026515 A1* | 1/2019 | Chiba | .............. G06K 7/10722 |
| 2019/0166716 A1* | 5/2019 | Li | .................. H05K 7/20145 |

* cited by examiner

*Primary Examiner* — Rockshana D Chowdhury
(74) *Attorney, Agent, or Firm* — Schwegman, Lundberg & Woessner (57) ABSTRACT

Disclosed is duct for a scanner for a point of sale terminal. The duct may include a first body portion and a second body portion. The first body portion may have a first edge and a second edge. The second body portion may have a third edge. The second body portion may be connected to the first body portion so as to define a duct cavity. The first edge may define a duct cavity exhaust opening. The second edge and the third edge may define a duct cavity inlet opening.

15 Claims, 6 Drawing Sheets

POINT OF SALE TERMINAL COOLING DUCT

SUMMARY

Disclosed is duct for a scanner for a point of sale terminal. The duct may include a first body portion and a second body portion. The first body portion may have a first edge and a second edge. The second body portion may have a third edge. The second body portion may be connected to the first body portion so as to define a duct cavity. The first edge may define a duct cavity exhaust opening. The second edge and the third edge may define a duct cavity inlet opening.

BRIEF DESCRIPTION OF THE FIGURES

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

Corresponding reference characters indicate corresponding parts throughout the several views. The exemplifications set out herein illustrate exemplary embodiments of the disclosure, and such exemplifications are not to be construed as limiting the scope of the disclosure any manner.

DETAILED DESCRIPTION

Disclosed herein is a duct that allows for the integration of the functions of a retail point of sale (POS) terminal with a high-performance imaging bar-code scanner/scale. The combination may allow one product to be used instead of two, saving money and space in the checkout terminal.

Traditional scale/scanner designed cannot operate with higher power chipsets due to fans and other cooling components causing airflow that interferes with the scale. For example, the fans induce an airflow that causes a negative pressure within a housing. The negative pressure essentially acts to bias the scale. In other words, the negative pressure is the equivalent of putting one's thumb on the scale so to speak. The result is that the scale will read a higher weight for items placed on the scale than the items actually weight.

The ducting solution disclosed herein allows fans, heat pipes, and fins to be used with motherboards to intake and exhaust air through a tower of a scanner. Using the ducting, air can be circulated through the scanner to dissipate heat to run high watt processor in a closed check-stand, sometimes called a POS terminal) without affecting the scale of the POS terminal. In addition, using the duct disclosed herein, vents that are necessary on traditional POS terminals that could expose the internal electronics to spills or other contaminations can be closed off or otherwise sealed to liquids.

As disclosed herein, the duct can be made from two portions. The two portions can be injection molded from the same mold and then snapped together. Once the two portions are assembled, the single duct can be added to a bin as a single part number for the bill of materials.

The duct can be manufactured from a flexible material. For example, the duct can be manufactured from a polymer that is flexible. The flexible nature of the duct can allow the duct to deform temporarily and be connected to a scanner tower and electronics housing of the POS terminal.

The scanner tower can define an exhaust in fluid communication with the duct so that air can exit the scanner. The exhaust can be integrated into a recess defined by the scanner tower. The recess can help hide the exhaust. The recess can also act as a handle to allow service technicians or others lift the scanner in and out of the terminal. The dual purpose of using the recess as a handle and to hide the exhaust vent allows for a cleaner overall design and aesthetically cleaner and more minimalist appearance while adding functionality.

As disclosed herein, the duct can include fins and other protrusions that allow the duct to be secured to the scanner tower and electronics housing without fasteners such as screws, rivets, or adhesives.

Figure 1:
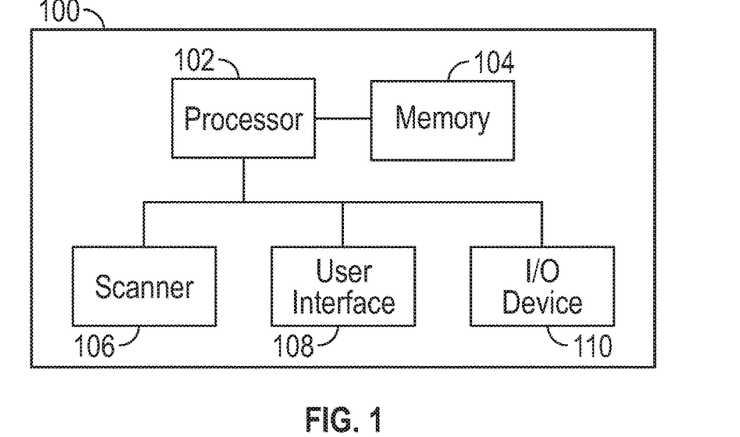
FIG. 1 shows an example schematic of a point of sale terminal consistent with examples disclosed herein.

Turning now to FIG. 1, FIG. 1 shows an example schematic of POS terminal 100 consistent with this disclosure. POS terminal 100 may include a processor 102, a memory 104, a scanner 106, a user interface 108, and an input/output (I/O) device 110. Processor 102 may be electrically coupled to memory 104, scanner 106, user interface 108, and I/O device 110. During operation, processor 102 may execute instructions stored in memory 104 to complete transactions. For example, during operations processor 102 may execute instructions to cause processor 102 to activate scanner 106, display and receive information via user interface 108, and receive or output information via I/O device 110. For instance, processor 102 may interact with scanner 106 to scan items. Scanner 106 can also be a scale that allows customers to weigh items such as produce.

Figure 2:
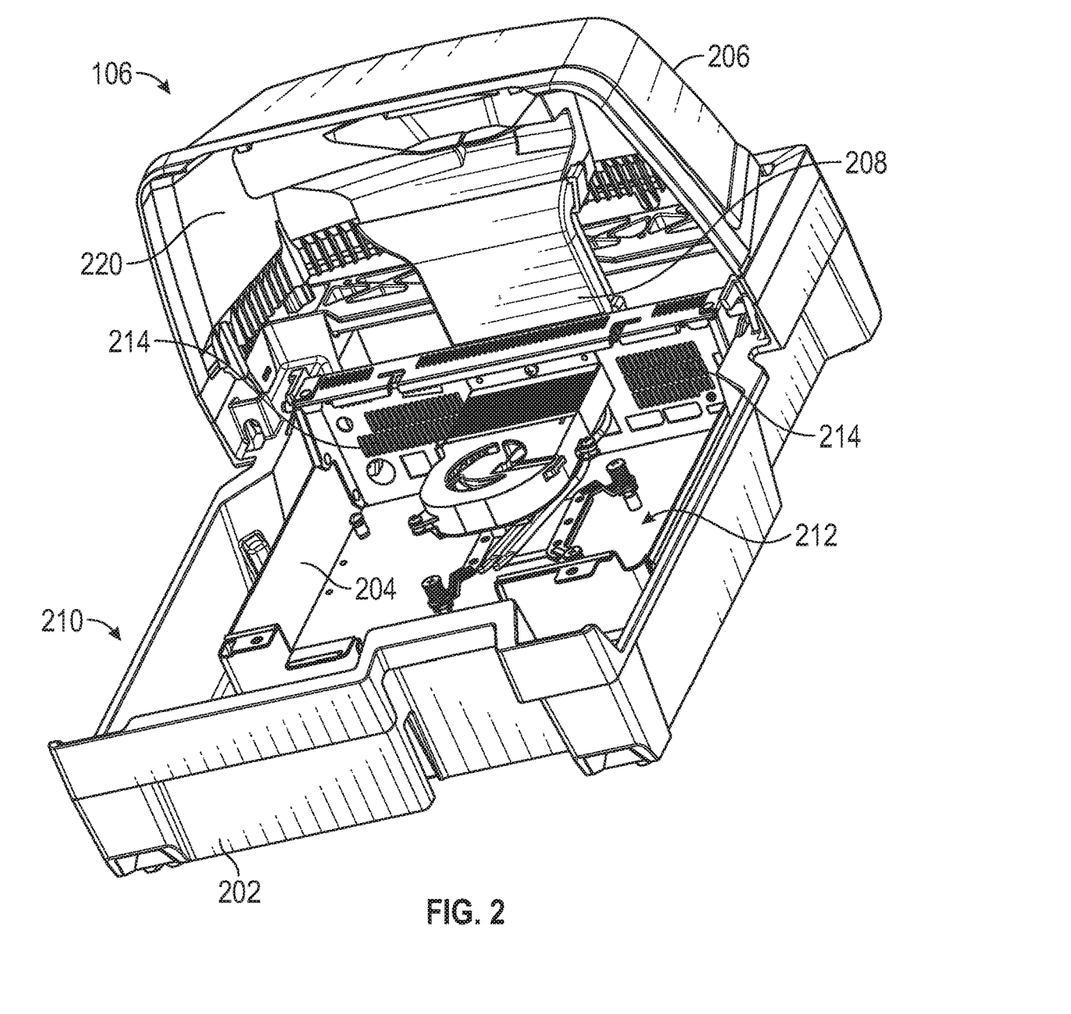
FIG. 2 shows an example scanner consistent with examples disclosed herein.
Figure 3A:
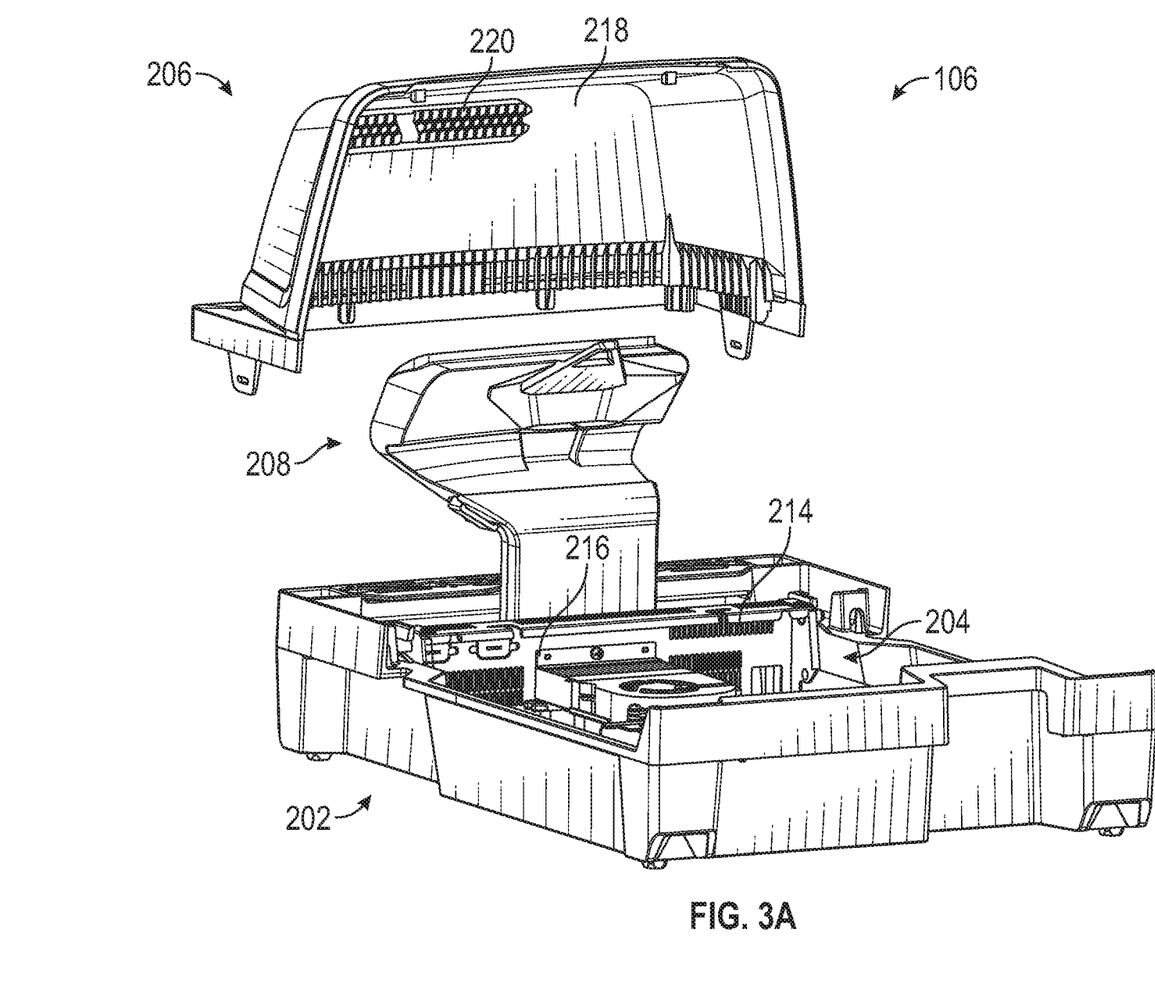
FIGS. 3A and 3B each show an exploded assembly of the scanner shown in FIG. 2.
Figure 3B:
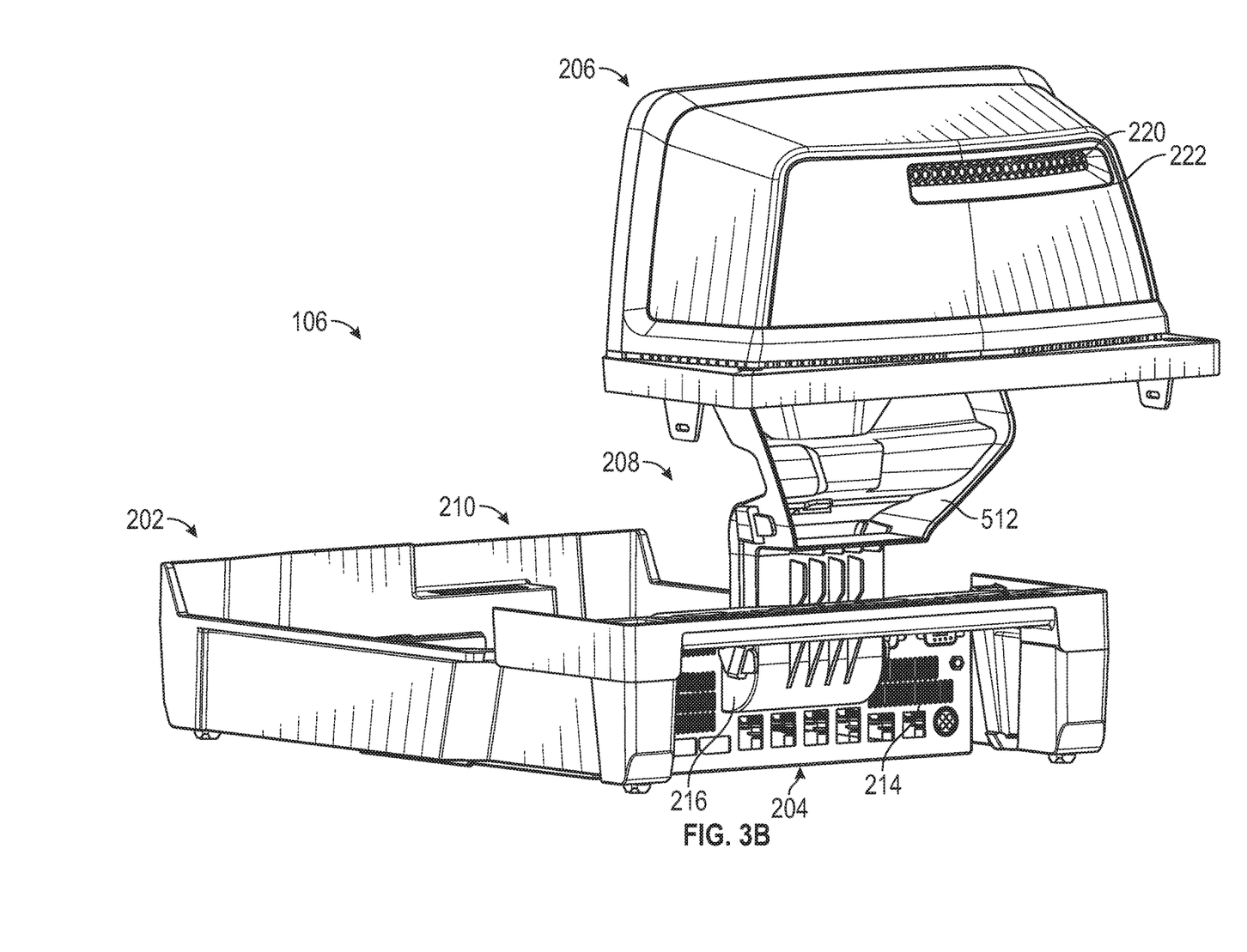

FIG. 2 shows scanner 106. FIGS. 3A and 3B each show an exploded assembly of scanner 106. As disclosed herein, scanner 106 may include a scanner bed 202, an electronics housing 204, a scanner tower 206, and a duct 208. For simplicity, items such as glass, scale bed, processor 102, memory 104, etc. have been omitted from FIGS. 2, 3A, and 3B for simplicity.

Scanner bed 202 can define a scanner bed cavity 210. Electronics housing 204 may be located within scanner bed cavity 210. Electronics housing 204 may define an electronics housing cavity 212. Electronics housing 204 may also define an electronics housing inlet 214 and an electronics housing exhaust 216.

Scanner tower 206 may define a scanner tower cavity 218 and a scanner tower exhaust 220. Scanner tower exhaust 220 may be part of a recess 222. Recess 222 may allow scanner tower exhaust 220 to be hidden. In addition, recess 222 may act as a handle to allow service technicians to grip scanner tower 206 to pull scanner 106 from POS terminal 100. Recess 222 can also act as a handle to allow service technicians or others lift the scanner bed 202 in and out of POS terminal 100. The dual purpose of using recess 222 as a handle and to hide scanner tower exhaust 220 can allow for a cleaner overall design and aesthetically cleaner and more minimalist appearance while adding functionality.

Figure 4:
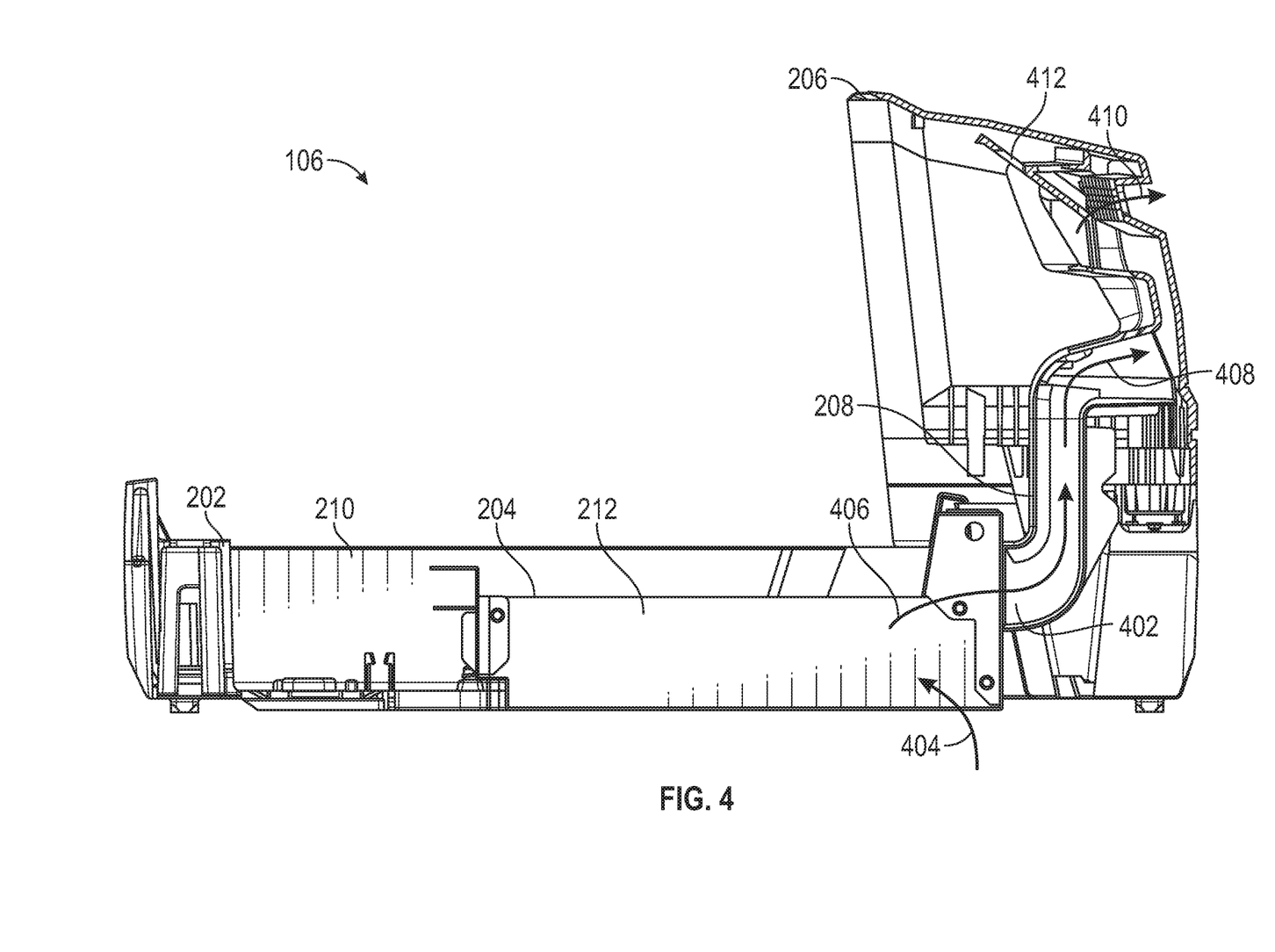
FIG. 4 shows a cross-sectional view of the scanner shown in FIG. 2.

FIG. 4 shows a cross-sectional view of scanner 106. As shown in FIG. 4, scanner tower 206 and duct 208 can define a cavity 402. Cavity 402 may allow air to flow into electronics housing 204 via electronics housing inlet 214 as indicated by arrow 404. Once inside electronics housing 204, the air may flow across processor 102, memory 104, and other electronic components, such as heat sinks, etc. to cool the electronics. After flowing past the electronics, the air may flow out of electronics housing 204 and into duct 208 as indicated by arrow 406. The air may exit scanner tower exhaust 220 as indicated by arrow 410.

Figure 5A:
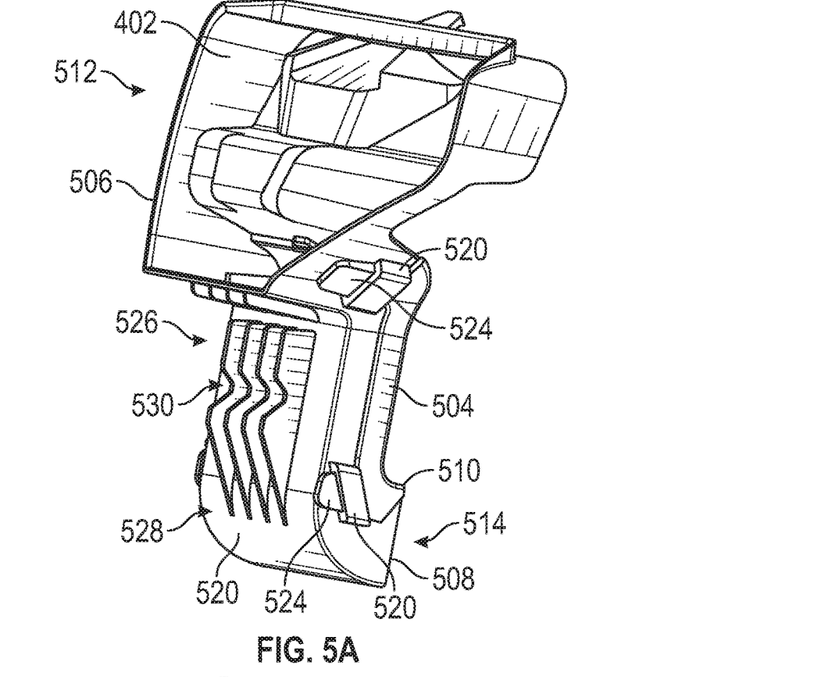
FIGS. 5A and 5B each show a duct consistent with examples disclosed herein.
Figure 5B:
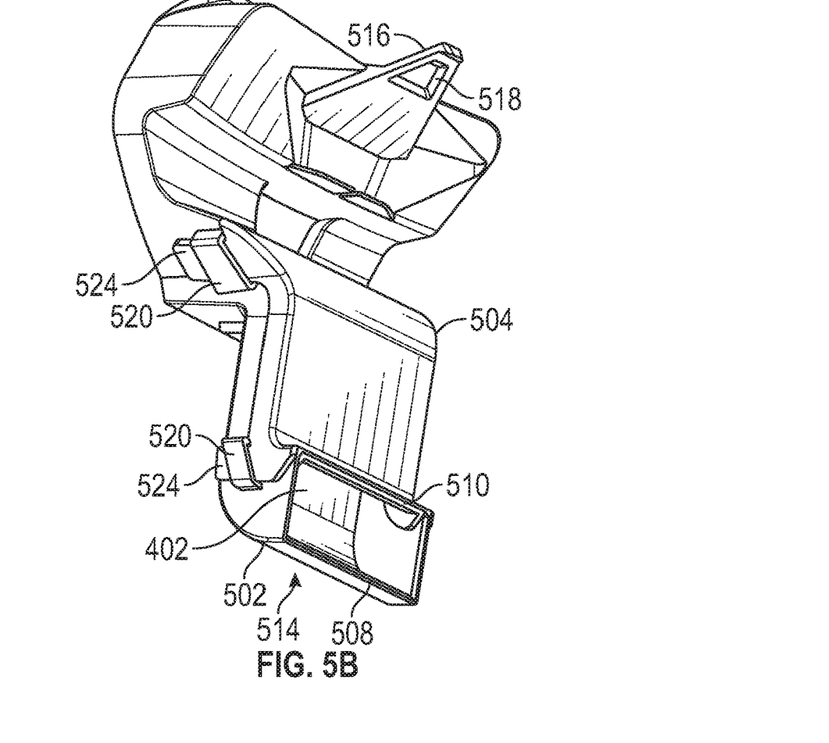
Figure 6:
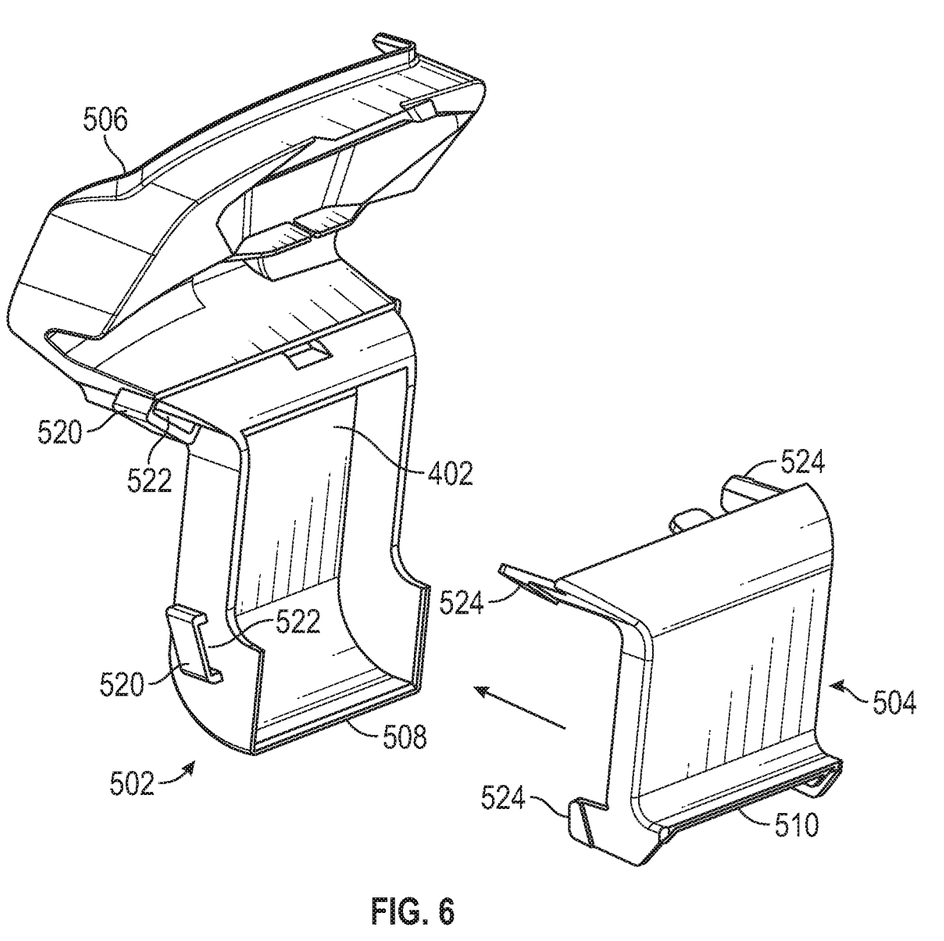
FIG. 6 shows an exploded assembly of the duct shown in FIGS. 5A and 5B.

FIGS. 5A and 5B each show duct 208. FIG. 6 shows an exploded assembly of duct 208. Duct 208 can include a first body portion 502 and a second body portion 504. When assembled, first body portion 502 and second body portion 504 define duct cavity 402.

First body portion 502 may have a first edge 506 and a second edge 508. Second body portion 504 may have a third edge 510. First edge 506 may define a duct cavity exhaust opening 512. As shown in FIG. 4, duct cavity exhaust opening 512 can rest against scanner tower 206 and surround scanner tower exhaust 220 as shown in FIG. 2. Second edge 508 and third edge 510 can define a duct cavity inlet opening 514. As shown in FIGS. 3A and 3B, duct cavity inlet opening 514 can rest against electronics housing 204 and surround electronics housing exhaust 216. The result is that air exiting electronic housing 204 enters duct 208 as indicated by arrow 406 shown in FIG. 4. As shown in FIGS. 5A and 5B, duct cavity inlet opening 514 can be on a first side of duct 208 and duct cavity exhaust opening 512 can be on a second side of duct 208. The first side and the second side can be opposite one another. Also, as shown in FIGS. 2-6, the duct cavity inlet opening 514 and the duct cavity exhaust opening 512 can be offset in a vertical direction from one another.

As shown in FIG. 5B, duct 208 can include a hook 516 that includes an opening 518. As shown in FIG. 4, opening 518 may engage a protrusion 412 extending from a surface of scanner tower 206. Hook 516 can act as a brace and engagement with protrusion 412 can cause hook 516 to press duct cavity exhaust opening 512 against scanner tower 206. In other words, hook 516 can press first edge 506 against scanner tower 206 to seal duct 208 to scanner tower 206.

As shown in FIGS. 5A-6, first body portion 502 can include a plurality of extensions 520. Each of the plurality of extensions 520 can define a hole 522. Second body portion 504 can include a plurality of tabs 524. Each of the tabs 524 can be sized to engage one of holes 522 of a corresponding one of the plurality of extensions 520. The tabs 524 can allow second body portion 504 to snap together with first body portion 502. The assembly of first body portion 502 and second body portion 504 can cause second edge 508 and third edge 510 to form duct cavity inlet opening 514.

Duct 208 may also include at least one fin 526. At least one fin 526 can protrude from a surface 528 of first body portion 502. The fins 526 can be sized to engage a portion of scanner tower 206 as shown in FIG. 4. For example, each of fins 526 can define a notch 530. Notches 530 can engage a protrusion or other feature of scanner tower 206. As a result, fins 526 can press duct 208, and more specifically, duct cavity inlet opening 414, against electronics housing 204.

The combination of fins 526, hook 516 and the curved shape of duct 208 allows duct 208 to be installed in scanner 106 without the use of fasteners such as screws, rivets, or adhesives.

EXAMPLES AND NOTES

The following, non-limiting examples, detail certain aspects of the present subject matter to solve the challenges and provide the benefits discussed herein, among others.

Example 1 is a duct for a point of sale (POS) tower, the duct comprising: a first body portion having a first edge and a second edge; and a second body portion having a third edge, the second body portion connected to the first body portion so as to define a duct cavity, the first edge defining a duct cavity exhaust opening on a first side of the duct, the second edge and the third edge defining a duct cavity inlet opening on a second side of the duct.

In Example 2, the subject matter of Example 1 optionally includes wherein the first side is opposite the second side.

In Example 3, the subject matter of any one or more of Examples 1-2 optionally include wherein the duct cavity exhaust opening and the duct cavity inlet opening are offset from one another.

In Example 4, the subject matter of any one or more of Examples 1-3 optionally include a hook arranged to engage a protrusion of a scanner tower.

In Example 5, the subject matter of any one or more of Examples 1-4 optionally include wherein the first body portion includes a plurality of extensions, each of the plurality of extensions defining a hole, wherein the second body portion includes a plurality of tabs, each of the tabs sized to engage the hole of a corresponding one of the plurality of extensions.

In Example 6, the subject matter of any one or more of Examples 1-5 optionally include at least one fin protruding from a surface of the first body portion, the at least one fin sized to engage a portion of a scanner tower.

In Example 7, the subject matter of Example 6 optionally includes wherein the at least one fin dines a notch.

In Example 8, the subject matter of any one or more of Examples 1-7 optionally include wherein the duct is a component of a scanner or a service terminal.

Example 9 is a scanner for a point of sale (POS) terminal, the scanner comprising: an electronics housing defining an electronics housing inlet and an electronics housing exhaust; a scanner tower defining a scanner tower cavity and a scanner tower exhaust leading from the scanner tower cavity to an exterior of the scanner tower; and a duct at least partially located within the scanner tower cavity, the duct defining a duct inlet and duct exhaust fluidly connecting the electronics housing exhaust and the scanner tower exhaust.

In Example 10, the subject matter of Example 9 optionally includes wherein duct inlet and the duct exhaust located on opposite sides of the duct.

In Example 11, the subject matter of any one or more of Examples 9-10 optionally include wherein the scanner tower defines a recess, the scanner tower exhaust located within the recess.

In Example 12, the subject matter of any one or more of Examples 9-11 optionally include wherein the scanner tower includes a protrusion and the duct includes a hook arranged to engage the protrusion.

In Example 13, the subject matter of any one or more of Examples 9-12 optionally include wherein the duct comprises a first body portion and a second body portion, the first body portion including a plurality of extensions, each of the plurality of extensions defining a hole, the second body portion including a plurality of tabs, each of the tabs sized to engage the hole of a corresponding one of the plurality of extensions.

In Example 14, the subject matter of any one or more of Examples 9-13 optionally include a plurality of fins protruding from a surface of the duct, the plurality of fins arranged to engage a surface of the scanner tower.

In Example 15, the subject matter of Example 14 optionally includes wherein each of the plurality of fines defines a notch sized to engage a protrusion extending from the surface of the scanner tower.

Example 16 is a point of sale (POS) terminal comprising: a scanner bed; an electronics housing located in the scanner bed, the electronics housing defining an electronics housing inlet and an electronics housing exhaust; a scanner tower defining a scanner tower cavity and a scanner tower exhaust leading from the scanner tower cavity to an exterior of the scanner tower; and a duct at least partially located within the scanner tower cavity, the duct comprising: a first body portion having a first edge and a second edge, the first edge defining a duct cavity exhaust opening in fluid communication with the scanner tower exhaust, and a second body portion connected to the first body portion, the second body portion having a third edge, the second edge and the third edge defining a duct cavity inlet in fluid communication with the electronics housing inlet, the duct defining a duct cavity fluidly connecting the duct cavity inlet and the duct cavity exhaust.

In Example 17, the subject matter of Example 16 optionally includes wherein the scanner tower defines a recess, the scanner tower exhaust located within the recess.

In Example 18, the subject matter of any one or more of Examples 16-17 optionally include wherein the scanner tower includes a protrusion and the duct includes a hook arranged to engage the protrusion.

In Example 19, the subject matter of any one or more of Examples 16-18 optionally include wherein the duct comprises a first body portion and a second body portion, the first body portion including a plurality of extensions, each of the plurality of extensions defining a hole, the second body portion including a plurality of tabs, each of the tabs sized to engage the hole of a corresponding one of the plurality of extensions.

In Example 20, the subject matter of any one or more of Examples 16-19 optionally include a plurality of fins protruding from a surface of the duct, each of the plurality of fines defining a notch sized to engage a protrusion extending from a surface of the scanner tower.

In Example 21, the apparatuses or method of any one or any combination of Examples 1-20 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A duct for a point of sale (POS) tower, the duct comprising:
   a first body portion having a first edge and a second edge; and
   a second body portion having a third edge, the second body portion connected to the first body portion so as to define a duct cavity,
   the first edge defining a duct cavity exhaust opening on a first side of the duct,
   the second edge and the third edge defining a duct cavity inlet opening on a second side of the duct, the duct cavity inlet arranged in a vertical orientation and directly connected to an electronics housing when installed in the POS tower,
   wherein
      the duct cavity exhaust opening and the duct cavity inlet opening are offset from one another,
      the first body portion includes a plurality of extensions, each of the plurality of extensions defining a hole,
      the second body portion includes a plurality of tabs, each of the tabs sized to engage the hole of a corresponding one of the plurality of extensions.

2. The duct of claim 1, wherein the first side is opposite the second side.

3. The duct of claim 1, further comprising a hook arranged to engage a protrusion of a scanner tower.

4. The duct of claim 1, further comprising at least one fin protruding from a surface of the first body portion, the at least one fin sized to engage a portion of a scanner tower.

5. The duct of claim 4, wherein the at least one fin dines a notch.

6. The duct of claim 1, wherein the duct is a component of a scanner or a service terminal.

7. A scanner for a point of sale (POS) terminal, the scanner comprising:
   an electronics housing defining an electronics housing inlet and an electronics housing exhaust;
   a scanner tower defining a scanner tower cavity and a scanner tower exhaust leading from the scanner tower cavity to an exterior of the scanner tower; and
   a duct at least partially located within the scanner tower cavity, the duct defining a duct inlet and duct exhaust fluidly connecting the electronics housing exhaust and the scanner tower exhaust, the duct cavity inlet arranged in a vertical orientation and directly connected to the electronics housing, the duct inlet and the duct exhaust located on opposite sides of the duct,
   wherein the duct comprises a first body portion and a second body portion,
      the first body portion including a plurality of extensions, each of the plurality of extensions defining a hole,
      the second body portion including a plurality of tabs, each of the tabs sized to engage the hole of a corresponding one of the plurality of extensions.

8. The scanner of claim 7, wherein the scanner tower defines a recess, the scanner tower exhaust located within the recess.

9. The scanner of claim 7, wherein the scanner tower includes a protrusion and the duct includes a hook arranged to engage the protrusion.

10. The scanner of claim 7, further comprising a plurality of fins protruding from a surface of the duct, the plurality of fins arranged to engage a surface of the scanner tower.

11. The scanner of claim 10, wherein each of the plurality of fines defines a notch sized to engage a protrusion extending from the surface of the scanner tower.

12. A point of sale (POS) terminal comprising:
   a scanner bed;
   an electronics housing located in the scanner bed, the electronics housing defining an electronics housing inlet and an electronics housing exhaust;
   a scanner tower defining a scanner tower cavity and a scanner tower exhaust leading from the scanner tower cavity to an exterior of the scanner tower; and
   a duct at least partially located within the scanner tower cavity, the duct comprising:
      a first body portion having a first edge and a second edge, the first edge defining a duct cavity exhaust opening in fluid communication with the scanner tower exhaust, and
      a second body portion connected to the first body portion, the second body portion having a third edge, the second edge and the third edge defining a duct cavity inlet in fluid communication with the electronics housing inlet, the duct defining a duct cavity fluidly connecting the duct cavity inlet and the duct cavity exhaust, the duct cavity inlet arranged in a vertical orientation and directly connected to the electronics housing,
   wherein the duct comprises a first body portion and a second body portion,
      the first body portion including a plurality of extensions, each of the plurality of extensions defining a hole, and
      the second body portion including a plurality of tabs, each of the tabs sized to engage the hole of a corresponding one of the plurality of extensions.

13. The POS of claim 12, wherein the scanner tower defines a recess, the scanner tower exhaust located within the recess.

14. The POS of claim 12, wherein the scanner tower includes a protrusion and the duct includes a hook arranged to engage the protrusion.

15. The POS of claim 12, further comprising a plurality of fins protruding from a surface of the duct, each of the plurality of fines defining a notch sized to engage a protrusion extending from a surface of the scanner tower.

* * * * *